US005753909A

United States Patent [19]

Park et al.

[11] Patent Number: 5,753,909

[45] Date of Patent: May 19, 1998

[54] HIGH RESOLUTION POSTSELECTOR FOR TIME-OF-FLIGHT MASS SPECTROMETERY

[75] Inventors: Melvin Park, Nashua, N.H.; Victor George Fursey, Beverly; John Wronka, Haverhill, both of Mass.

[73] Assignee: Bruker Analytical Systems, Inc., Billerica, Mass.

[21] Appl. No.: 560,404

[22] Filed: Nov. 17, 1995

[51] Int. Cl.[6] .............................. B01D 59/44; H01J 49/00

[52] U.S. Cl. .............................. 250/287; 250/281

[58] Field of Search .............................. 250/282, 281, 250/287

[56] References Cited

U.S. PATENT DOCUMENTS

| | | | |
|---|---|---|---|
| 3,634,683 | 1/1972 | Bakker | 250/287 |
| 4,733,073 | 3/1988 | Becker et al. | 250/287 |
| 4,894,536 | 1/1990 | Conzemius | 250/287 |
| 5,045,694 | 9/1991 | Beavis et al. | 250/287 |
| 5,144,127 | 9/1992 | Williams et al. | 250/287 |
| 5,160,840 | 11/1992 | Vestal | 250/287 |

*Primary Examiner*—Bruce Anderson

*Attorney, Agent, or Firm*—Ward & Olivo

[57] ABSTRACT

A method and apparatus for analyzing ions by determining times of flight including using a collision cell to activate ions toward fragmentation and a deflector to direct ions away from their otherwise intended or parallel course. Deflectors are used as gates, so that particular ions may be selected for deflection, while others are allowed to continue along their parallel or otherwise straight path, from the ion source, through a flight tube, and eventually, to a detector. According to the present invention, a postselector, in the form of two deflection plates is used as an ion deflector and is encountered by ions after the collision cell as they progress through the spectrometer.

20 Claims, 9 Drawing Sheets

FIG. 6A
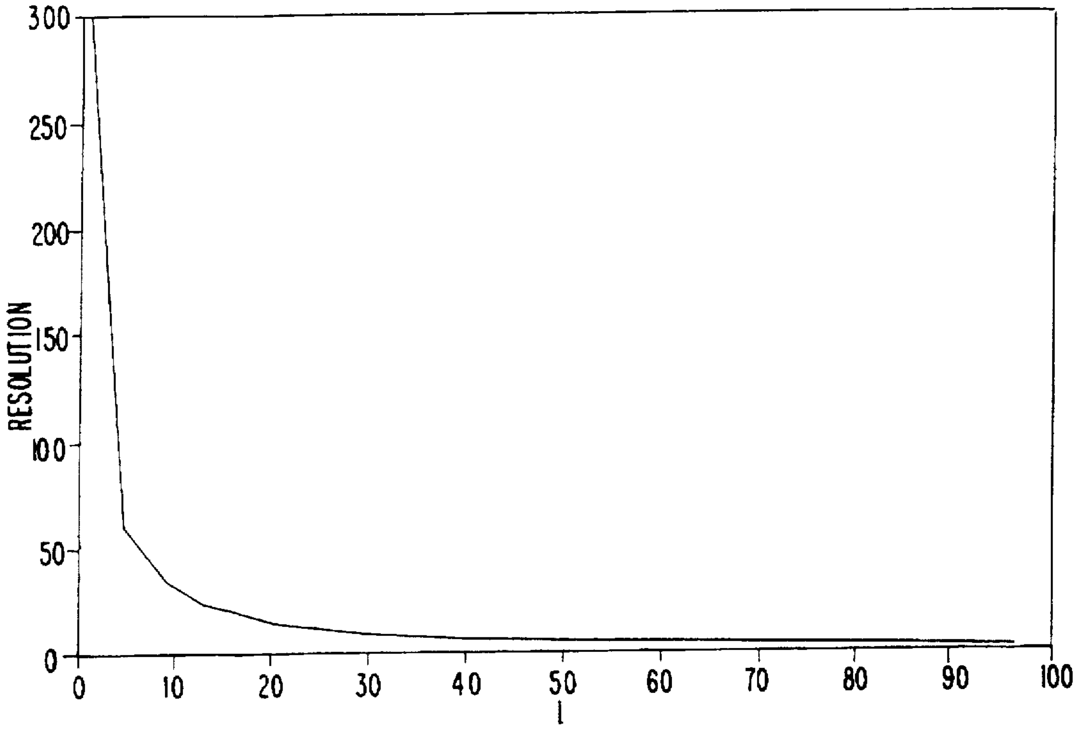
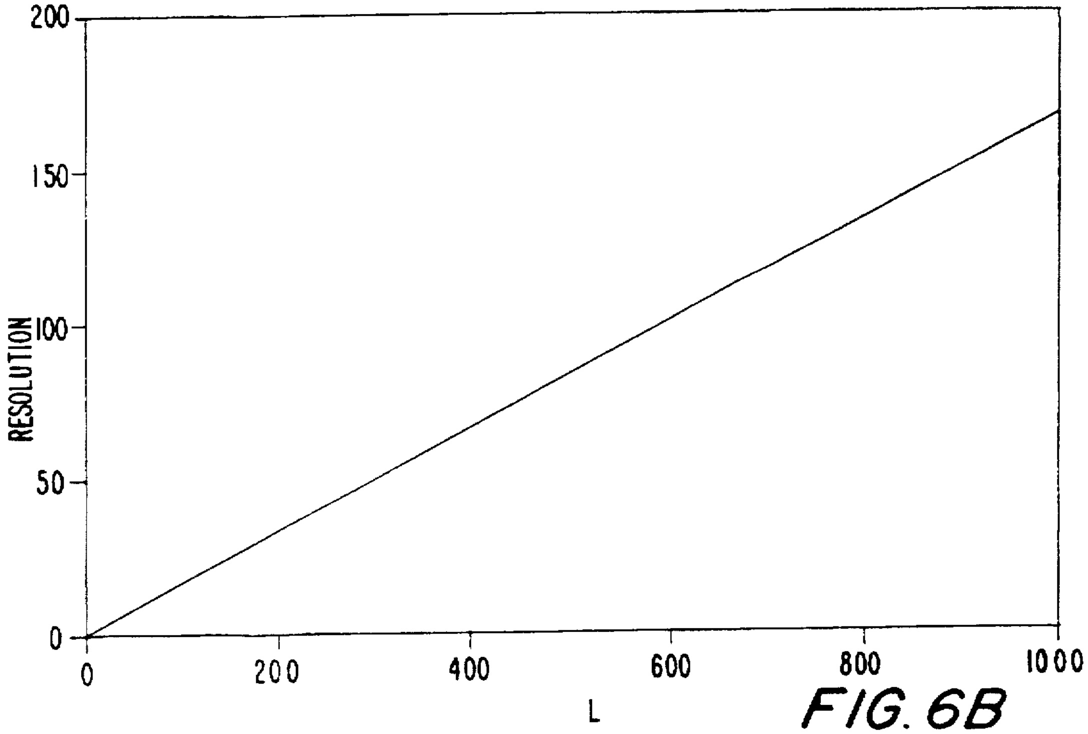
FIG. 6B

HIGH RESOLUTION POSTSELECTOR FOR TIME-OF-FLIGHT MASS SPECTROMETERY

TECHNICAL FIELD

This invention relates generally to ion beam handling and more particularly to a gate for use in time-of-flight mass spectrometry.

BACKGROUND ART

This invention relates in general to ion beam handling in mass spectrometers and more particularly to ion gating in time-of-flight mass spectrometers (TOFMS). The apparatus and method of mass analysis described herein is an enhancement of the techniques that are referred to in the literature relating to mass spectrometry.

The analysis of ions by mass spectrometers is important, as mass spectrometers are instruments that are used to determine the chemical structures of molecules. In these instruments, molecules become positively or negatively charged in an ionization source and the masses of the resultant ions are determined in vacuum by a mass analyzer that measures their mass/charge (m/z) ratio. Mass analyzers come in a variety of types, including magnetic field (B), combined (double-focusing) electrical (E) and magnetic field (B), quadrupole (Q), ion cyclotron resonance (ICR), quadrupole ion storage trap, and time-of-flight (TOF) mass analyzers, which are of particular importance with respect to the invention disclosed herein. Each mass spectrometric method has a unique set of attributes. Thus, TOFMS is one mass spectrometric method that arose out of the evolution of the larger field of mass spectrometry.

The analysis of ions by TOFMS is, as the name suggests, based on the measurement of the flight times of ions from an initial position to a final position. Ions which have the same initial kinetic energy but different masses will separate when allowed to drift through a field free region.

Ions are conventionally extracted from an ion source in small packets. The ions acquire different velocities according to the mass-to-charge ratio of the ions. Lighter ions will arrive at a detector prior to high mass ions. Determining the time-of-flight of the ions across a propagation path permits the determination of the masses of different ions. The propagation path may be circular or helical, as in cyclotron resonance spectrometry, but typically linear propagation paths are used for TOFMS applications.

TOFMS is used to form a mass spectrum for ions contained in a sample of interest. Conventionally, the sample is divided into packets of ions that are launched along the propagation path using a pulse-and-wait approach. In releasing packets, one concern is that the lighter and faster ions of a trailing packet will pass the heavier and slower ions of a preceding packet. Using the traditional pulse-and-wait approach, the release of an ion packet as timed to ensure that the ions of a preceding packet reach the detector before any overlap can occur. Thus, the periods between packets is relatively long. If ions are being generated continuously, only a small percentage of the ions undergo detection. A significant amount of sample material is thereby wasted. The loss in efficiency and sensitivity can be reduced by storing ions that are generated between the launching of individual packets, but the storage approach carries some disadvantages.

Resolution is an important consideration in the design and operation of a mass spectrometer for ion analysis. The traditional pulse-and-wait approach in releasing packets of ions enables resolution of ions of different masses by separating the ions into discernible groups. However, other factors are also involved in determining the resolution of a mass spectrometry system. "Space resolution" is the ability of the system to resolve ions of different masses despite an initial spatial position distribution within an ion source from which the packets are extracted. Differences in starting position will affect the time required for traversing a propagation path. "Energy resolution" is the ability of the system to resolve ions of different mass despite an initial velocity distribution. Different starting velocities will affect the time required for traversing the propagation path.

In addition, two or more mass analyzers may be combined in a single instrument to form a tandem mass spectrometer (MS/MS, MS/MS/MS, etc.). The most common MS/MS instruments are four sector instruments (EBEB or BEEB), triple quadrupoles (QQQ), and hybrid instruments (EBQQ or BEQQ). The mass/charge ratio measured for a molecular ion is used to determine the molecular weight of a compound. In addition, molecular ions may dissociate at specific chemical bonds to form fragment ions. Mass/charge ratios of these fragment ions are used to elucidate the chemical structure of the molecule. Tandem mass spectrometers have a particular advantage for structural analysis in that the first mass analyzer (MS1) can be used to measure and select molecular ion from a mixture of molecules, while the second mass analyzer (MS2) can be used to record the structural fragments. In tandem instruments, a means is provided to induce fragmentation in the region between the two mass analyzers. The most common method employs a collision chamber filled with an inert gas, and is known as collision induced dissociation CID. Such collisions can be carried out at high (5–10 keV) or low (10–100 eV) kinetic energies, or may involve specific chemical (ion-molecule) reactions. Fragmentation may also be induced using laser beams (photodissociation), electron beams (electron induced dissociation), or through collisions with surfaces (surface induced dissociation). It is possible to perform such an analysis using a variety of types of mass analyzers including TOF mass analysis.

In a TOFMS instrument, molecular and fragment ions formed in the source are accelerated to a kinetic energy:

$$eV=\frac{1}{2}mv^2 \qquad (1)$$

where e is the elemental charge, V is the potential across the source/accelerating region, m is the ion mass, and v is the ion velocity. These ions pass through a field-free drift region of length L with velocities given by equation 1. The time required for a particular ion to traverse the drift region is directly proportional to the square root of the mass/charge ratio:

$$t=L\sqrt{\frac{m}{2eV}} \qquad (2)$$

Conversely, the mass/charge ratios of ions can be determined from their flight times according to the equation:

$$\frac{m}{e}=at^2+b \qquad (3)$$

where a and b are constants which can be determined experimentally from the flight times of two or more ions of known mass/charge ratios.

Generally, TOF mass spectrometers have limited mass resolution. This arises because there may be uncertainties in the time that the ions were formed (time distribution), in their location in the accelerating field at the time they were formed (spatial distribution), and in their initial kinetic energy distributions prior to acceleration (energy distribution).

The first commercially successful TOFMS was based on an instrument described by Wiley and McLaren in 1955 (Wiley, W. C.; McLaren, I. H., Rev. Sci. Instrumen. 26 1150 (1955)). That instrument utilized electron impact (EI) ionization (which is limited to volatile samples) and a method for spatial and energy focusing known as time-lag focusing. In brief, molecules are first ionized by a pulsed (1–5 microsecond) electron beam. Spatial focusing was accomplished using multiple-stage acceleration of the ions. In the first stage, a low voltage (−150 V) drawout pulse is applied to the source region that compensates for ions formed at different locations, while the second (and other) stages complete the acceleration of the ions to their final kinetic energy (−3 keV ). A short time-delay (1–7 microseconds) between the ionization and drawout pulses compensates for different initial kinetic energies of the ions, and is designed to improve mass resolution. Because this method required a very fast (40 ns) rise time pulse in the source region, it was convenient to place the ion source at ground potential, while the drift region floats at −3 kV. The instrument was commercialized by Bendix Corporation as the model NA-2, and later by CVC Products (Rochester, N.Y.) as the model CVC-2000 mass spectrometer. The instrument has a practical mass range of 400 daltons and a mass resolution of 1/300, and is still commercially available.

There have been a number of variations on this instrument. Muga (TOFTEC, Gainsville) has described a velocity compaction technique for improving the mass resolution (Muga velocity compaction). Chatfield et al. (Chatfield FT-TOF) described a method for frequency modulation of gates placed at either end of the flight tube, and Fourier transformation to the time domain to obtain mass spectra. This method was designed to improve the duty cycle.

Cotter et al. (VanBreeman, R. B.: Snow, M.: Cotter, R. J., Int. J. Mass Spectrom. Ion Phys. 49 (1983) 35.; Tabet, J. C.; Cotter, R. J., Anal. Chem. 56 (1984) 1662; Olthoff, J. K.; Lys, I.: Demirev, P.: Cotter, R. J., Anal. Instrumen. 16 (1987) 93, modified a CVC 2000 time-of-flight mass spectrometer for infrared laser desorption of involatile biomolecules, using a Tachisto (Needham, Mass.) model 215G pulsed carbon dioxide laser. This group also constructed a pulsed liquid secondary time-of-flight mass spectrometer (liquid SIMS-TOF) utilizing a pulsed (1–5 microsecond) beam of 5 keV cesium ions, a liquid sample matrix, a symmetric push/pull arrangement for pulsed ion extraction (Olthoff, J. K.; Cotter, R. J., Anal. Chem. 59 (1987) 999–1002.; Olthoff, J. K.; Cotter, R. J., Nucl. Instrum. Meth. Phys. Res. B-26 (1987) 566–570. In both of these instruments, the time delay range between ion formation and extraction was extended to 5–50 microseconds, and was used to permit metastable fragmentation of large molecules prior to extraction from the source. This in turn reveals more structural information in the mass spectra.

The plasma desorption technique introduced by Macfarlane and Torgerson in 1974 (Macfarlane, R. D.; Skowronski, R. P.; Torgerson, D. F., Biochem. Biophys. Res Commoun. 60 (1974) 616.) formed ions on a planar surface placed at a voltage of 20 kV. Since there are no spatial uncertainties, ions are accelerated promptly to their final kinetic energies toward a parallel, grounded extraction grid, and then travel through a grounded drift region. High voltages are used, since mass resolution is proportional to U o /;eV, where the initial kinetic energy, U 0 / is of the order of a few electron volts. Plasma desorption mass spectrometers have been constructed at Rockefeller (Chait, B. T.; Field, F. H., J. Amer. Chem. Soc. 106 (1984) 193), Orsay (LeBeyec, Y.; Della Negra, S.; Deprun, C.; Vigny, P.; Giont, Y. M., Rev. Phys. Appl 15 (1980) 1631), Paris (Viari, A.; Ballini, J. P.; Vigny, P.; Shire, D.; Dousset, P., Biomed. Environ. Mass Spectrom, 14 (1987) 83), Upsalla (Hakansson, P.; Sundqvist B., Radiat. Eff. 61 (1982) 179) and Darmstadt (Becker, O.; Furstenau, N.; Krueger, F. R.; Weiss, G.; Wein, K., Nucl. Instrum. Methods 139 (1976) 195). A plasma desorption time-of-flight mass spectrometer has bee commercialized by BIO-ION Nordic (Upsalla, Sweden). Plasma desorption utilizes primary ion particles with kinetic energies in the MeV range to induce desorption/ionization. A similar instrument was constructed at Manitobe (Chain, B. T.; Standing, K. G., Int. J. Mass Spectrum. Ion Phys. 40 (198.1) 185) using primary ions in the keV range, but has not been commercialized.

Matrix-assited laser desorption, introduced by Tanaka et al. (Tanaka, K.; Waki, H.; Ido, Y.; Akita, S.; Yoshida, Y.; Yoshica, T., Rapid Commun. Mass Spectrom. 2 (1988) 151) and by Karas and Hillenkamp (Karas, M.; Hillenkamp, F., Anal. Chem. 60 (1988) 2299) utilizes TOFMS to measure the molecular weights of proteins in excess of 100,000 daltons. An instrument constructed at Rockefeller (Beavis, R. C.; Chait, B. T., Rapid Commun. Mass Spectrom. 3 (1989) 233) has been commercialized by VESTEC (Houston, Tex.), and employs prompt two-stage extraction of ions to an energy of 30 keV.

Time-of-flight instruments with a constant extraction field have also been utilized with multi-photon ionization, using short pulse lasers.

The instruments described thus far are linear time-of-flights, that is: there is no additional focusing after the ions are accelerated and allowed to enter the drift region. Two approaches to additional energy focusing have been utilized: those which pass the ion beam through an electrostatic energy filter.

The reflectron (or ion mirror) was first described by Mamyrin (Mamyrin, B. A.; Karatajev, V. J.; Shmikk, D. V.; Zagulin, V. A., Sov. Phys., JETP 37 (1973) 45). At the end of the drift region, ions enter a retarding field from which they are reflected back through the drift region at a slight angle. Improved mass resolution results from the fact that ions with larger kinetic energies must penetrate the reflecting field more deeply before being turned around. These faster ions than catch up with the slower ions at the detector and are focused. Reflectrons were used on the laser microprobe instrument introduced by Hillenkamp et al. (Hillenkamp, F.; Kaufmann, R.; Nitsche, R.; Unsold, E., Appl. Phys. 8 (1975) 341) and commercialized by Leybold Hereaus as the LAMMA (LAser Microprobe Mass Analyzer). A similar instrument was also commercialized by Cambridge Instruments as the IA ( Laser Ionization Mass Analyzer). Benninghoven (Benninghoven reflectron) has described a SIMS (secondary ion mass spectrometer) instrument that also utilizes a reflectron, and is currently being commercialized by Leybold Hereaus. A reflecting SIMS instrument has also been constructed by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

Lebeyec (Della-Negra, S.; Lebeyec, Y., in Ion Formation from Organic Solids IFOS III, ed. by A. Benninghoven, pp 42–45, Springer-Verlag, Berlin (1986)) described a coaxial reflectron time-of-flight that reflects ions along the same path in the drift tube as the incoming ions, and records their arrival times on a channelplate detector with a centered hole that allows passage of the initial (unreflected) beam. This geometry was also utilized by Tanaka et al. (Tanaka, K.; Waki, H.; Ido, Y.; Akita, S.; Yoshida, T., Rapid Comun. Mass Spectrom. 2 (1988) 151) for matrix assisted laser desorption. Schlag et al. (Grotemeyer, J.; Schlag, E. W., Org. Mass Spectrom. 22 (1987) 758) have used a reflectron on a two-laser instrument. The first laser is used to ablate solid samples, while the second laser forms ions by multiphoton ionization. This instrument is currently available from Bruker. Wollnik et al. (Grix., R.; Kutscher, R.; Li, G.; Gruner, U.; Wollnik, H., Rapid Commun. Mass Spectrom. 2 (1988) 83) have described the use of reflectrons in combination with pulsed ion extraction, and achieved mass resolutions as high as 20,000 for small ions produced by electron impact ionization.

An alternative to reflectrons is the passage of ions through an electrostatic energy filter, similar to that used in double-focusing sector instruments. This approach was first described by Poschenroeder (Poschenroeder, W., Int. J. Mass Spectrom. Ion Phys. 6 (1971) 413). Sakurai et al. (Sakuri, T.; Fujita, Y; Matsuo, T.; Matsuda, H; Katakuse, I., Int. J. Mass Spectrom. Ion Processes 66 (1985) 283) have developed a time-of-flight instrument employing four electrostatic energy analyzers (ESA) in the time-of-flight path. At Michigan State, an instrument known as the ETOF was described that utilizes a standard ESA in the TOF analyzer (Michigan ETOF).

Lebeyec et al. (Della-Negra, S.; Lebeyec, Y., in Ion Formation from Organic Solids IFOS III, ed. by A. Benninghoven, pp 42–45, Springer-Verlag, Berlin (1986)) have described a technique known as correlated reflex spectra, which can provide information on the fragment ion arising from a selected molecular ion. In this technique, the neutral species arising from fragmentation in the flight tube are recorded by a detector behind the reflectron at the same flight time as their parent masses. Reflected ions are registered only when a neutral species is recorded within a preselected time window. Thus, the resultant spectra provide fragment ion (structural) information for a particular molecular ion. This technique has also been utilized by Standing (Standing, K. G.; Beavis, R.; Bollbach, G.; Ens, W.; Lafortune, F.; Main, D.; Schueler, B.; Tang, X.; Westmore, J. B., Anal. Instrumen. 16 (1987) 173).

Although TOF mass spectrometers do not scan the mass range, but record ions of all masses following each ionization event, this mode of operation has some analogy with the linked scans obtained on double-focusing sector instruments. In both instruments, MS/MS information is obtained at the expense of high resolution. In addition correlated reflex spectra can be obtained only on instruments which record single ions on each TOF cycle, and are therefore not compatible with methods (such as laser desorption) which produce high ion currents following each laser pulse.

New ionization techniques, such as plasma desorption (Macfarlane, R. D.; Skowronski, R. P.; Torgerson, D. F.; Biochem. Bios. Res. Commun. 60 (1974) 616), laser desorption (VanBreemen, R. B.; Snow, M.; Cotter, R. J., Int. J. Mass Spectrom. Ion Phys. 49 (1983) 35; Van der Peyl, G.J.Q.; Isa, K.; Haverkamp, J.; Kistemaker, P. G., Org. Mass Spectrom. 16 (1981) 416), fast atom bombardment (Barber, M.; Bordoli, R. S.; Sedwick, R. D.; Tyler, A. N., J. Chem. Soc., Chem. Commun. (1981) 325–326) and electrospray (Meng, C. K.; Mann, M.; Fenn, J. B., Z. Phys. D10 (1988) 361), have made it possible to examine the chemical structures of proteins and peptides, glycopeptides, glycolipids and other biological compounds without chemical derivatization. The molecular weights of intact proteins can be determined using matrix assisted laser desorption ionization (MALDI) on a TOF mass spectrometer or electrospray ionization. For more detailed structural analysis, proteins are generally cleaved chemically using CNBr or enzymatically using trypsinor other proteases. The resultant fragments, depending upon size, can be mapped using MALDI, plasma desorption or fast atom bombardment. In this case, the mixture of peptide fragments (digest) is examined directly resulting in a mass spectrum with a collection of molecular ion corresponding to the masses of each of the peptides. Finally, the amino acid sequences of the individual peptides which make up the whole protein can be determined by fractionation of the digest, followed by mass spectral analysis of each peptide to observe fragment ions that correspond to its sequence.

It is the sequencing of peptides for which tandem mass spectrometry has its major advantages. Generally, most of the new ionization techniques are successful in producing intact molecular ions, but not in producing fragmentation. In a tandem instrument the first mass analyzer passes parent ions (also referred to as "reactant ions") corresponding to molecules of the peptide of interest. These ions are activated toward fragmented in a collision chamber, and their fragmentation products extracted and focused into the second mass analyzer which records a fragment ion (or daughter ion) spectrum.

A conventional tandem TOFMS consists of two TOF analysis regions with an ion gate and a collision chamber between the two regions. Ions of interest may be selected with the ion gate before being activated in the collision cell. As in conventional TOFMS, ions of increasing mass have decreasing velocities and increasing flight times. Thus, the arrival time of ions at the ion gate at the end of the first TOF analysis region is dependent on the mass-to-charge ratio of the ions. If one opens the ion gate only at the arrival time of the ion mass of interest, then only ions of that mass-to-charge will be passed into the collision cell and the second TOF analysis region.

The arrival times of product ions at the end of the second TOF analysis region is dependent on the product ion mass because a reflectron is used. Because the flight time of an ion through a reflectron is dependent on the kinetic energy of the ion, and the kinetic energy of the product ions are dependent on their masses, the flight time of the product ions through the reflectron is dependent on their masses.

SUMMARY OF THE INVENTION

One of the advantages in using tandem TOFMS in a collisionally activated dissociation (CAD) type of experiment is that the molecular ions may fragment over a long period of time following activation. Useful fragmentations may occur for up to 10 us or even 100 us after activation in tandem TOFMS rather than typically 1 us in other types of tandem spectrometers. As a result, a lower activation energy is required and a greater percentage of the parent ions are observed to fragment. This results in a higher signal intensity in the daughter ion spectrum. To obtain such long useful fragmentation times, the activation step (which occurs in the collision cell) should occur near the source. Because the molecular ion is selected before collisional activation in a typical tandem spectrometer, the selector must also be near the source. This limits the ion selection resolution which can be obtained because in TOFMS the resolution is directly related to the distance between the ion source and the selector.

In tandem TOFMS, molecular ion selection is typically achieved by the use of pulsed deflection plates. However, the mass resolution of such selection is typically low (~25). The term resolution as it is used here refers to the ability of the selector to pass a given mass ion—without perturbing its trajectory or flight time—while deflecting ions of greater or lesser mass out of the ion beam.

The purpose of the present invention is to achieve higher mass resolution selection than is available by conventional means without reduction in sensitivity. The present invention places the pulsed deflection plates at a position after the collision cell (as encountered by the ions). The products of an ion dissociation that occurs after the molecular ion has left the source will have the same velocity as the original ion. The product ions will therefore arrive at the ion selector at the same time as the original ion and will be passed by the gate (or not) just as the original ion would have been. Thus, it is not required that the ion selector be placed before the collision cell, but only that it be placed after the exit of the source. By placing the selector at a greater distance from the source, the resolution of molecular ion selection is increased and the long useful fragmentation time inherent to TOFMS is retained.

The invention is a specific design for a tandem TOF mass spectrometer incorporating two analyzers. This instrument incorporates Einsel lens focusing, a collision cell, and a patented (U.S. Pat. No. 4,731,532) two stage gridless reflector.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

FIG. 6A is a plot of the resolution of molecular ion selection as a function of length (l) of the deflection plates;

FIG. 6B is a plot of the resolution of molecular ion selection as a function of the length, L, between the ion source and the deflection plates;

DETAILED DESCRIPTION OF THE PREFERRED EMBODIMENT

Figure 1:
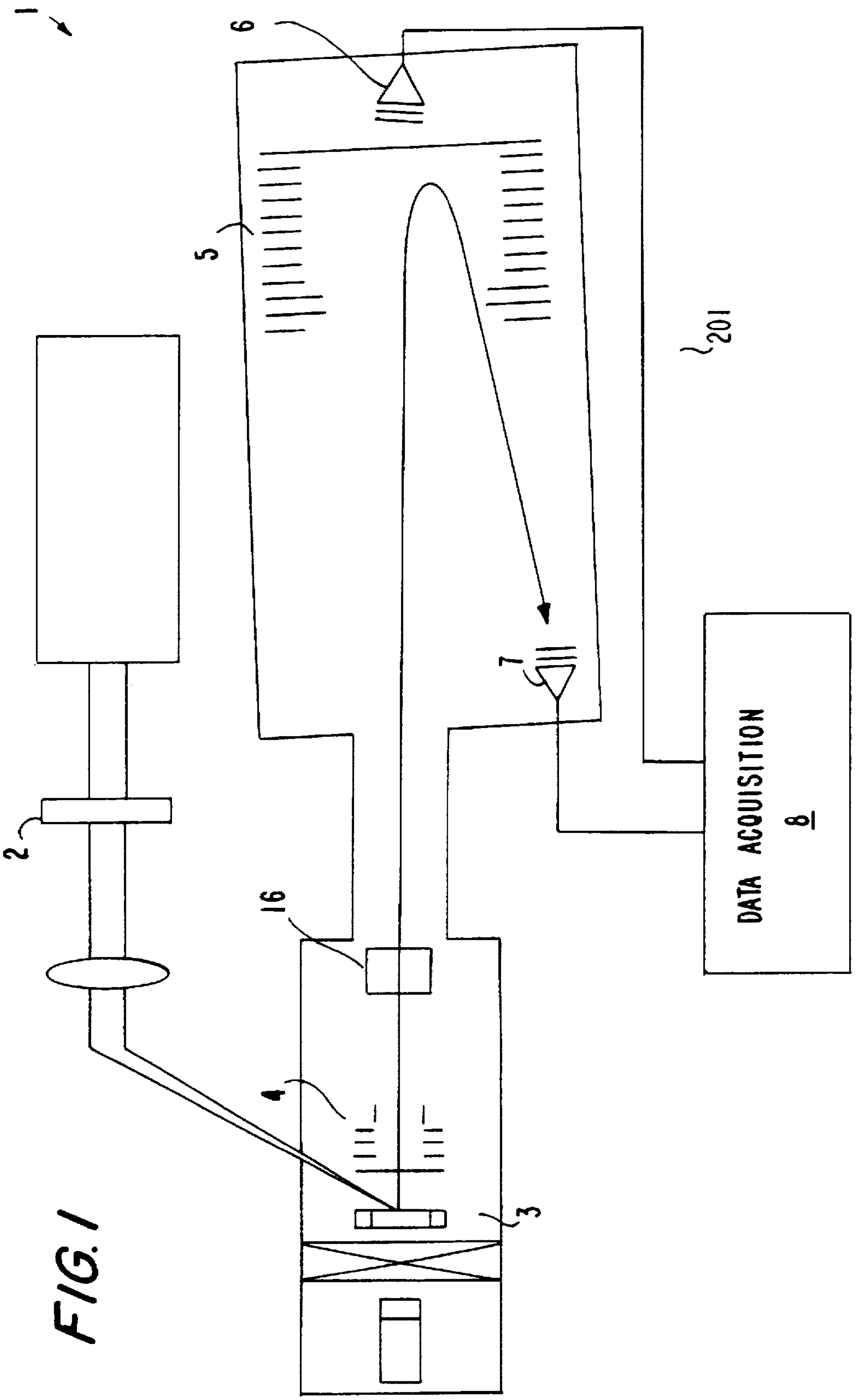
FIG. 1 is a schematic view of prior art commonly referred to as a REFLEX spectrometer.

With respect to FIG. 1, a prior art TOFMS 1 is shown, with a laser system 2, ion source 3, deflector 4, collision cell 16, reflector 5, linear detector 6, reflector detector 7 and a data acquisition unit 8. In FIG. 1, laser system 2 produces short (~3 ns wide) pulses of laser radiation. The laser pulses generate ion packets from a solid sample in the source. These ion packets are accelerated through, and out of, the ion source 3 by an electrostatic field.

The molecular ion of interest can be selected using the deflector 4. While deflector 4 is energized, ions passing through it are deflected to a path which does not lead to detection. When deflector 4 is deenergized, ions may pass through it without being perturbed. As given by equation 2, the ions require some time to travel the distance L between the point of generation and the deflector. This time is dependent on the ion mass according to equation 2. Thus, by energizing and deenergizing deflector at appropriate times after the laser pulse, a given mass ion may be passed unperturbed whereas ions of greater or lesser mass are deflected out of the beam. Alternatively, all or a range of ion masses may be selected.

Selected ions enter collision cell 16. If desired, collision cell 16 is filled to some pressure with a collision gas. In such a case, the selected ions undergo collisions with the collision gas molecules and may become activated toward fragmentation. Selected ions and their fragments then drift through the spectrometer until they arrive at the linear detector 6. Alternatively, the reflector 5 may be used to reflect the ions so that they travel to the reflector detector 7. The mass and abundance of the ions is measured via the data acquisition system 8 as the flight time of the ions from the source 2 to one of the detectors 6 or 7 and the signal intensity at the detectors respectively.

Figure 2:
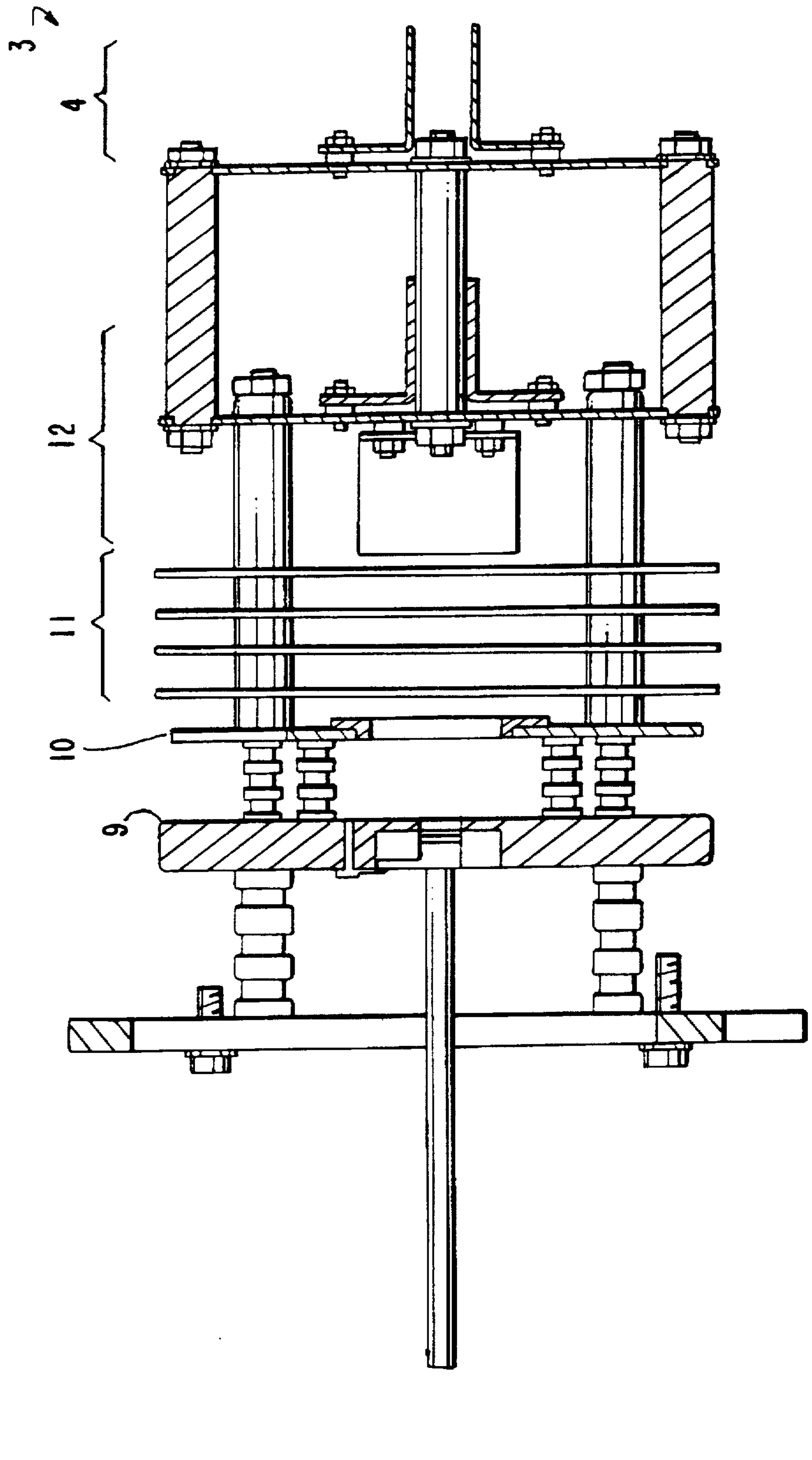
FIG. 2 is a diagram of an ion source, as used with the present invention.

With respect to FIG. 2, a diagram of an ion source 3 as used with the present invention is shown. Ion packets are generated by a laser pulse at the surface of the sample plate 9 which is biased to a high voltage (e.g. 20 kV). Extraction plate 10 is held at ground potential. The electric field resulting from the potential difference between elements 9 and 10 accelerates the generated ions toward extraction plate 10. Ions are focused by the electrostatic lens system 11, and steered in two dimensions by plates 12. Finally, deflection plates 4 are used to select ions of interest.

Figure 3:
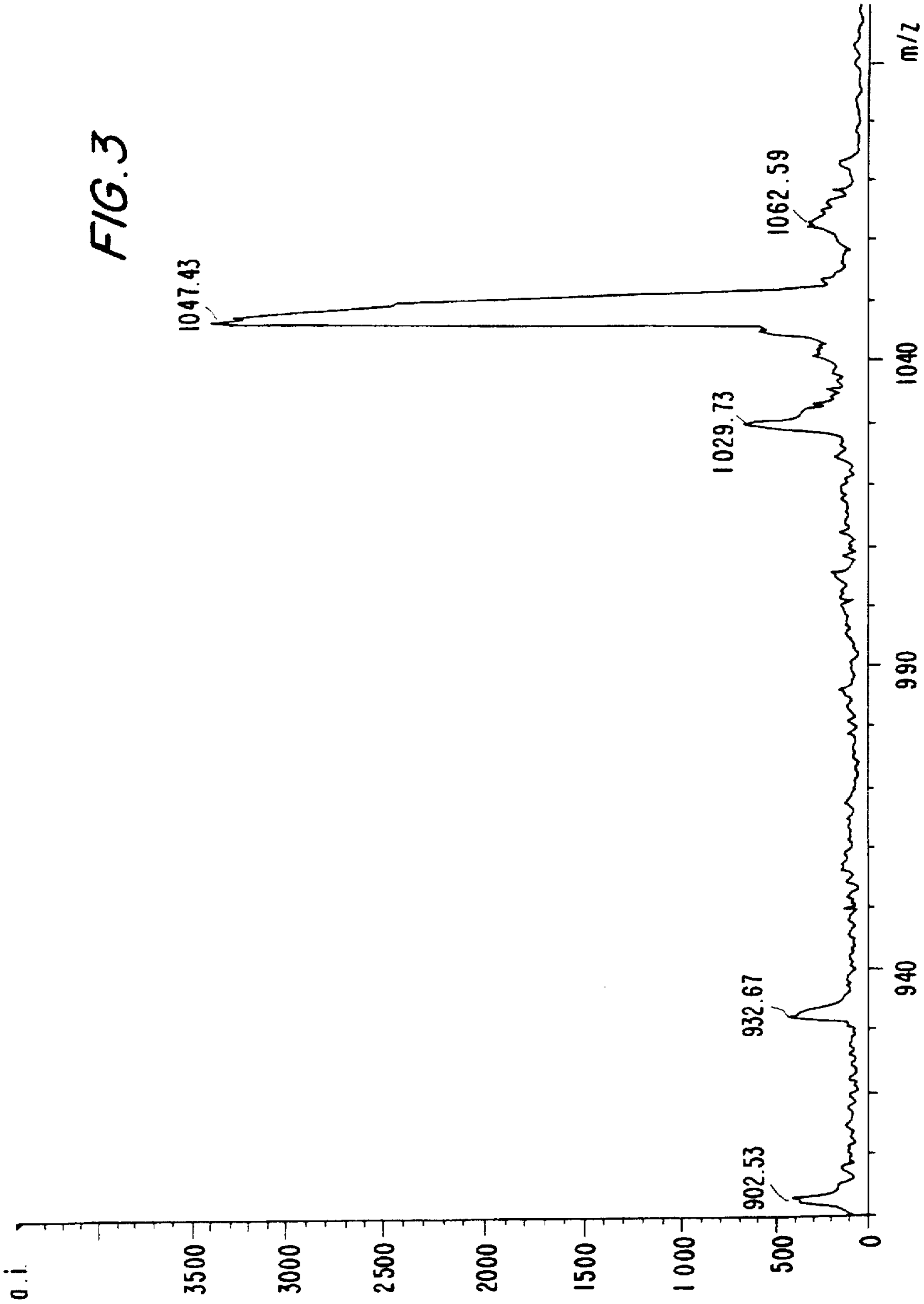
FIG. 3 is a graph of the mass spectrum of angiotensin II showing the molecular ion at mass 1047 amu, using a prior art TOF system.

With respect to FIG. 3, a graph of the mass spectrum of angiotensin II showing the molecular ion at mass 1047 amu, using a prior art TOF system (REFLEX) is shown. This spectrum was recorded using reflector 5 and detector 7. As a result, it is possible to observe some ions (at apparent masses 902, 933, and 1030 amu) which are products of the dissociation of the molecular ions.

Figure 4:
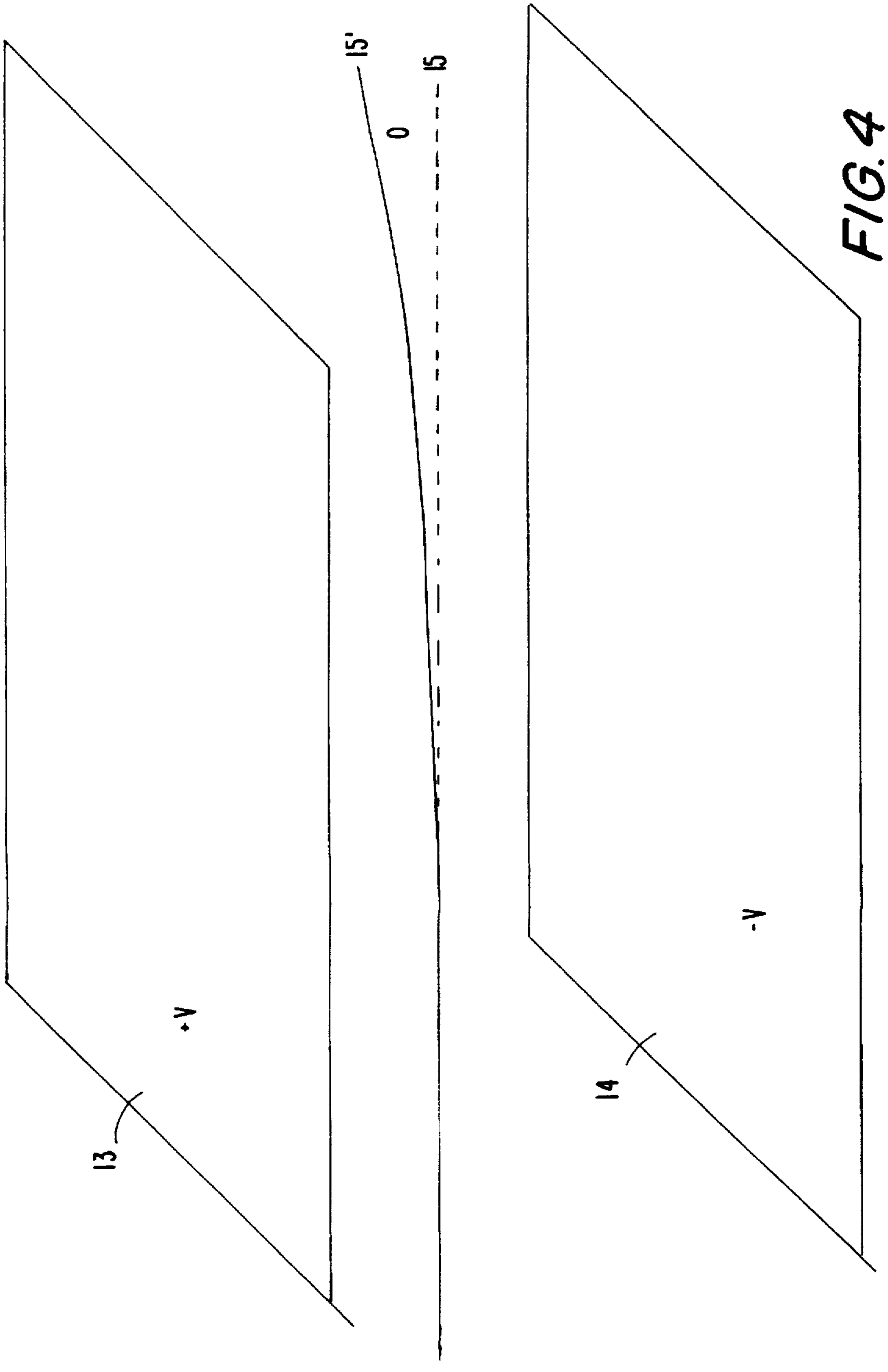
FIG. 4 is a view of the plate arrangement according to a conventional ion deflector, used in TOFMS.

FIG. 4 is a view of the deflection plate arrangement according to the present invention. In TOFMS, ions of greater or lesser masses than the ion of interest are removed from the ion beam by deflecting these ions from the principal beam axis 15. This is accomplished by using deflection plates 13 and 14. In the deflection plate arrangement, two metal plates 13 and 14 are adjacent to one another, on opposite sides of the ion beam, and approximately parallel to the ion beam, to form the complete deflector assembly as shown in FIG. 4. By energizing plates 13 to +V and plate 14 to −V, ion packets are deflected from path 15 to path 15'. Ions deflected to path 15' are not detected and so are considered to be deselected. Ions which continue along path 15 are eventually detected and so are considered to be selected.

Ions passing between plates 13 and 14 are deflected by an angle:

$$\text{Tan}(\theta) = \frac{qV}{\epsilon}\left(\frac{1}{d}\right) \quad (4)$$

where θ is the angle of deflection (as shown in FIG. 4), V is the voltage on the plates, and l is the length of the plates in the flight direction 15, q is the elemental charge, d is the distance between plates 13 and 14, and ε is the kinetic energy of the ion. Note that under a given set of conditions, one can obtain the same degree of deflection at, for example, half the voltage by doubling l or decreasing d by a factor of 2.

Typically, the values of these variables may be, q=1 elemental charge, V=700 V, l=10 mm, d=5 mm, and ε=20 keV. This leads to an angle of deflection from the energized device of 4°. This is the angle by which deselected ions are deflected. When the deflector is deenergized, V=0 V, thus the angle of deflection produced by the deenergized device is 0°. So, selected ions continue unperturbed and are eventually detected.

Figure 5B:
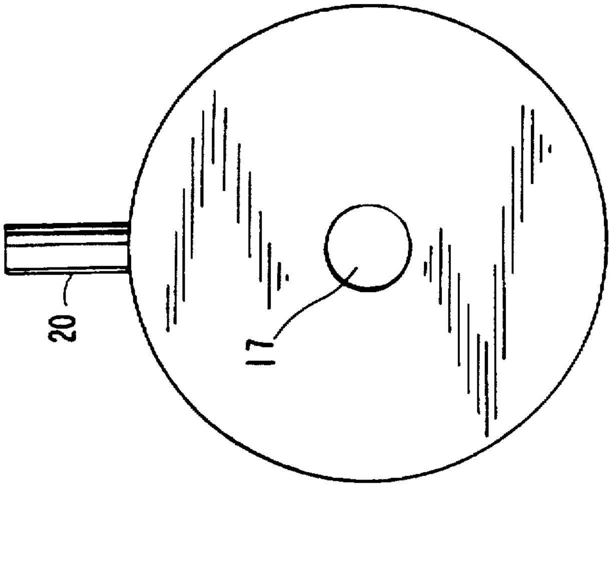
FIG. 5B is an end view of the collision cell as used with a time-of-flight mass spectrometer.
Figure 5A:
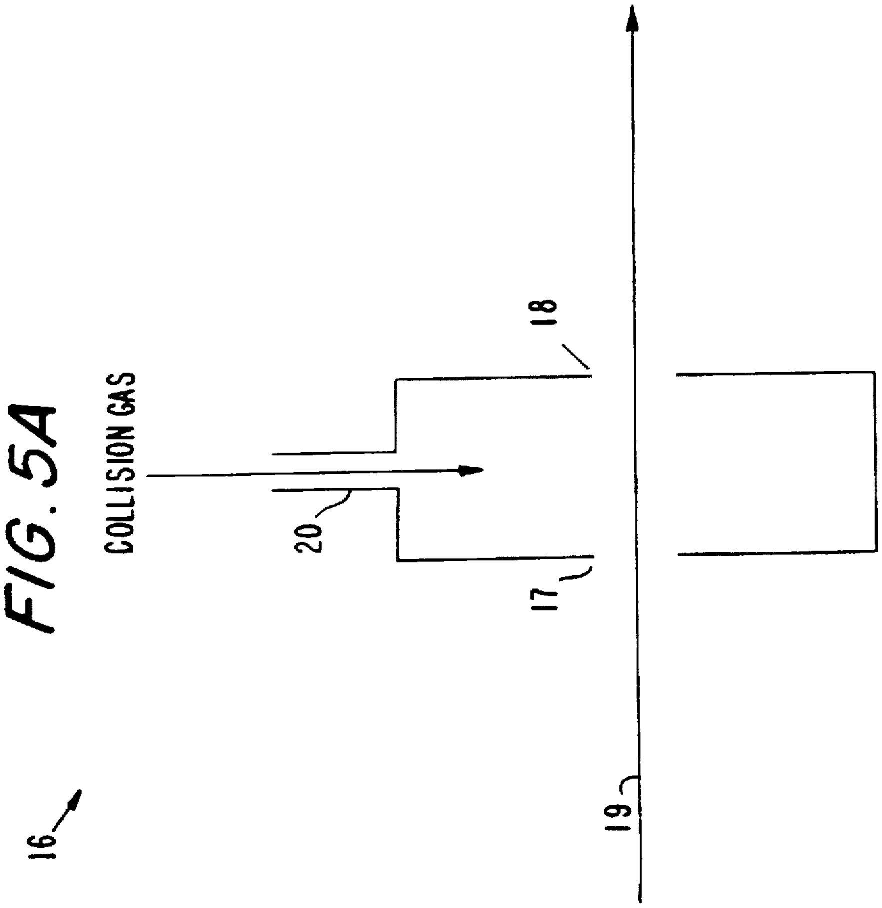
FIG. 5A is a cross sectional view of a collision cell as used with a time-of-flight mass spectrometer.

As discussed regarding FIG. 1, in prior art spectrometer 1, the deflection plates 4 are located between the source and collision cell 16. FIG. 5A is a cross sectional view of collision cell 16. As depicted in FIG. 5A, ions pass through collision cell 16 along a path which is parallel to path 19. Collision gas is fed into the collision cell through inlet 20 and exits the collision cell through orifices 17 and 18. Ions passing through the collision cell may have collisions with the collision gas in accordance with the collisional cross section of the ions and the pressure of the collision gas. The average number of collisions experienced by an ion can be estimated by:

$$N_c = \frac{\pi r^2 x P N}{RT} \quad (5)$$

where $N_c$ is the average number of collisions, r is the cross sectional radius of the ion, x is the length of the collision cell, P is the pressure in the collision cell, N is Avagadro's number, R is the universal gas constant, and T is the temperature of the gas. At a pressure, P, of 0.1 mbar, $N_c$, would be about 6 collision depending on the cross section of the ion and the length, x, of the collision cell.

As a result of these collisions, some of the kinetic energy of the ions is converted into internal energy. Depending on the mass of the collision gas molecules and the kinetic energy and mass of the ion, on the order of 100 eV of kinetic energy may be converted to internal energy per collision. If enough internal energy is gained an ion may become activated toward fragmentation. Activated ions may later fragment to form product ions.

The kinetic energy lost by the ions is an important issue because this will affect the flight time of the ions and therefore their apparent masses. As a result, while there is some loss of mass resolution in collisionally activated dissociation (CAD) experiments, it is not typically of consequence in performing a tandem TOFMS analysis.

Once through the collision cell, ions continue to drift through the spectrometer until arriving at a detector. Activated ions may undergo fragmentation at some point between the collision cell and the detector. Fragmentation of an ion will typically lead to the production of one ion and one neutral species. The process of fragmentation will release a few eV of kinetic energy, so the product species may move somewhat faster or slower in the time of flight direction. However, because the molecular ions typically have a kinetic energy of 5–30 keV the few eV of kinetic energy released via fragmentation will have no practical influence on the mass analysis of the products. That is, the product species will have practically the same velocity as the molecular ion from which they were formed. Because they have the same velocity, product species will travel the same distance in the same amount of time as the parent ion and they will arrive at the deflector at the same time. If the deflector is deenergized at the time of arrival of the parent ion, both the parent and the daughter ions will pass through the deflector unperturbed. In this way, both the daughter ions and the parents from which they are formed are simultaneously selected or deselected.

As a result, the ion selector may be inserted into any position in a TOFMS system, between the source and analyzer region. For example, such a gate may be located in the position of deflection plates 4 at the end of source 3 or anywhere between collision cell 16 and reflector 5.

The advantages of using a postselector of the present invention over conventional preselectors are demonstrated in FIGS. 6A and 6B. FIGS. 6A and 6B shows plots relating the resolution of molecular ion selection to the length, l, of the selector deflection plates, and to the distance, L, between the source and the selector, respectively. When using deflection plates to select ions, the resolution of molecular ion selection can be approximated as:

$$R = \frac{L}{2l} \quad (6)$$

where R is the mass resolution of the gating device, L is the distance from the source to the gating device, and l is the effective length of the deflection plates—including its associated electric field—in the direction of ion motion. Thus, as shown in FIG. 6A, the resolution decreases rapidly with increasing deflection plate length. In contrast as depicted in FIG. 6B, the resolution increases linearly with the distance between the source and deflector. Clearly from FIG. 6B and equation 6, if the position of the collision cell is to remain fixed, improved ion selection resolution can be achieved only by postselecting ions—i.e. by placing the deflector after the collision cell—rather than by preselecting the ions—i.e. by placing the deflector before the collision cell.

Figure 7:
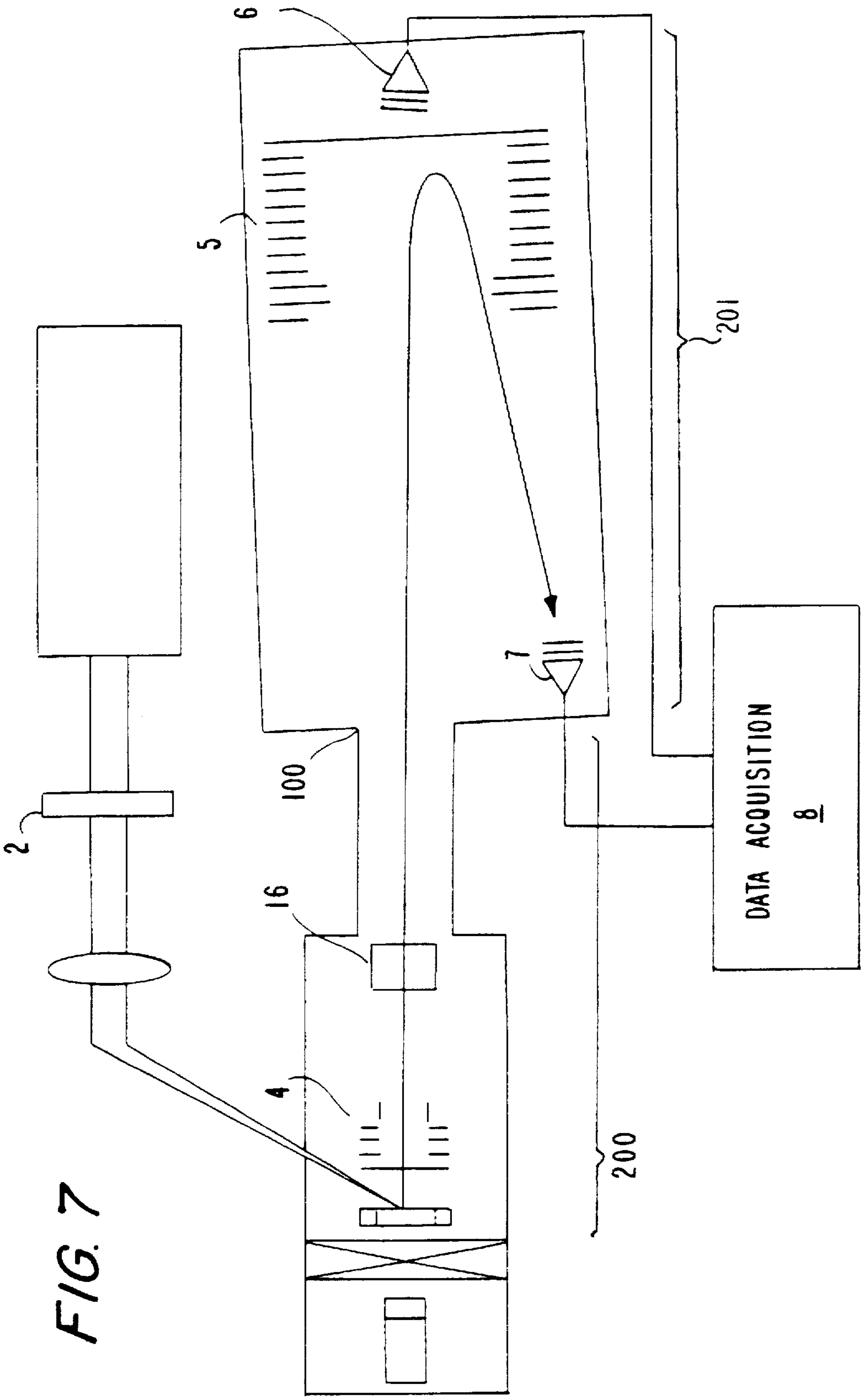
FIG. 7 is a schematic view of the REFLEX spectrometer including the postselector.

With respect to FIG. 7, the previously described REFLEX instrument 1 now including a postselector 100 according to the present invention. Postselector 100 is located between two TOF analysis regions 200 and 201. In the first of the TOF analysis regions 200, the parent ions—the original ions produced from the source 3—are collisionally activated and mass analyzed. Although deflector 4 is still present, it remains inactive or is used only for coarse ion gating. The parent ion of interest is selected by gating the ion beam using postselector 100. Using postselector 100 it is possible to allow only those parent ions of interest to pass from the first to the second analysis region. In analysis region 201, the daughter ions—generated by the dissociation of the selected parent ion—are mass analyzed and recorded via reflector 5, detector 7, and data acquisition system 8.

In prior art instrument 1, the preselector was located before the collision cell at a distance from the source of about 25 cm. Also, the effective length l of the device was about 5 mm. As a result, the resolution of the device was only about 25. As depicted in FIG. 7, the postselector is positioned farther from the source than the collision cell 16. By placing the postselector about 60 cm from the source and decreasing its effective length to about 3 mm, a molecular ion selection resolution of better than 110 is obtained.

Figure 8:
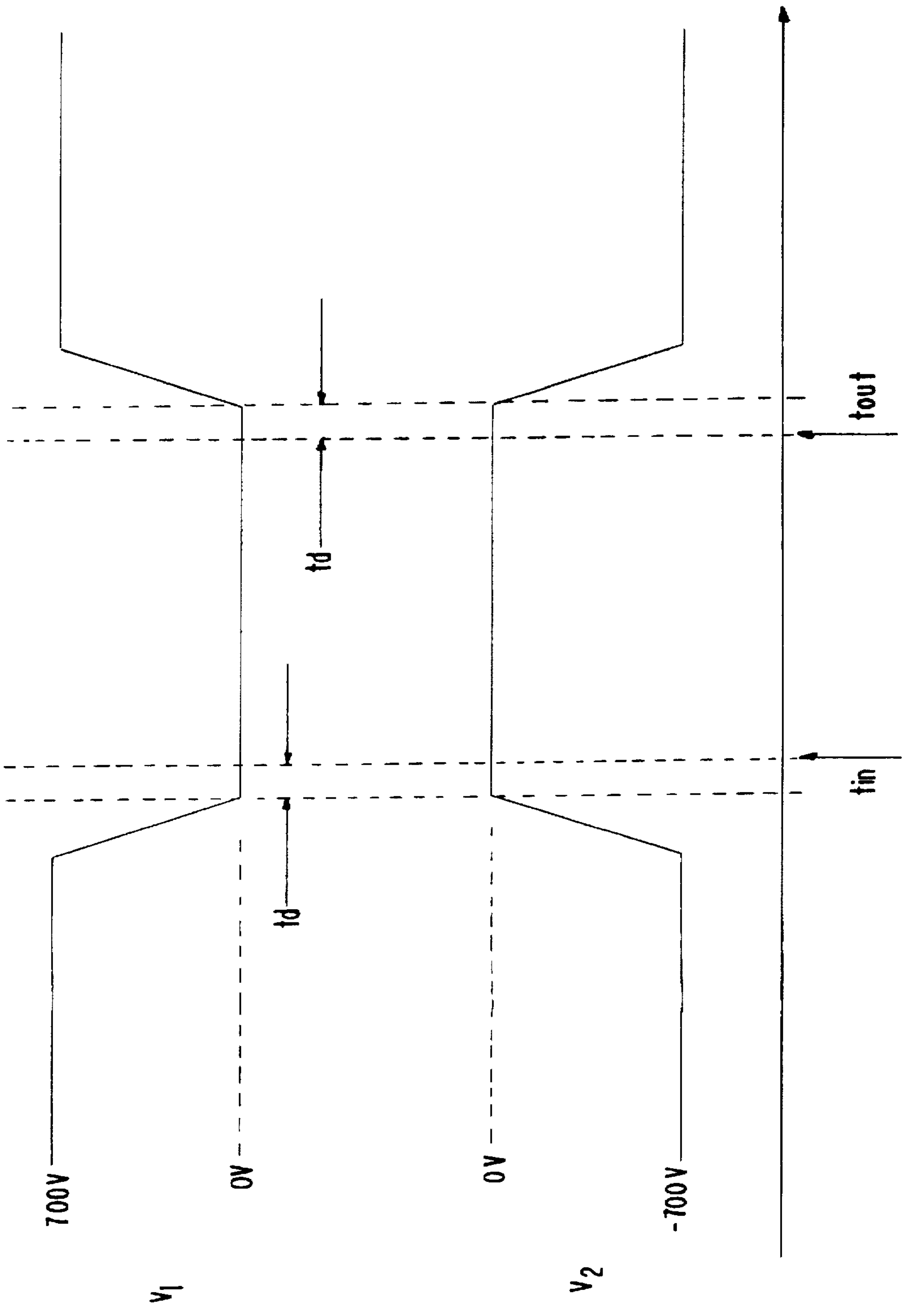
FIG. 8 is an example timing diagram of the use of the postselector in the REFLEX spectrometer.

With respect to FIG. 8, an example timing diagram is shown. From the time of ion generation until a short time before the ion of interest enters the postselector 100, the potentials on the plates 13 and 14 are held at +700 V and −700 V respectively as discussed with respect to FIG. 4. This causes all ions of lower mass than the ions of interest to be deflected out of the beam. At time tin the ions of interest arrive at the gate 100 and at time tout, the ions exit the gate. Some time td before the ions of interest arrive at gate 100, the potential on plates 13 and 14 are brought to ground potential. Plates 13 and 14 are held at ground potential until some short time td after the ions of interest leave the gate. Thereafter, the potentials on the plates 13 and 14 are maintained at +/−700 V. This causes all ions of higher mass than the ions of interest to be deflected out of the beam.

Figure 9:
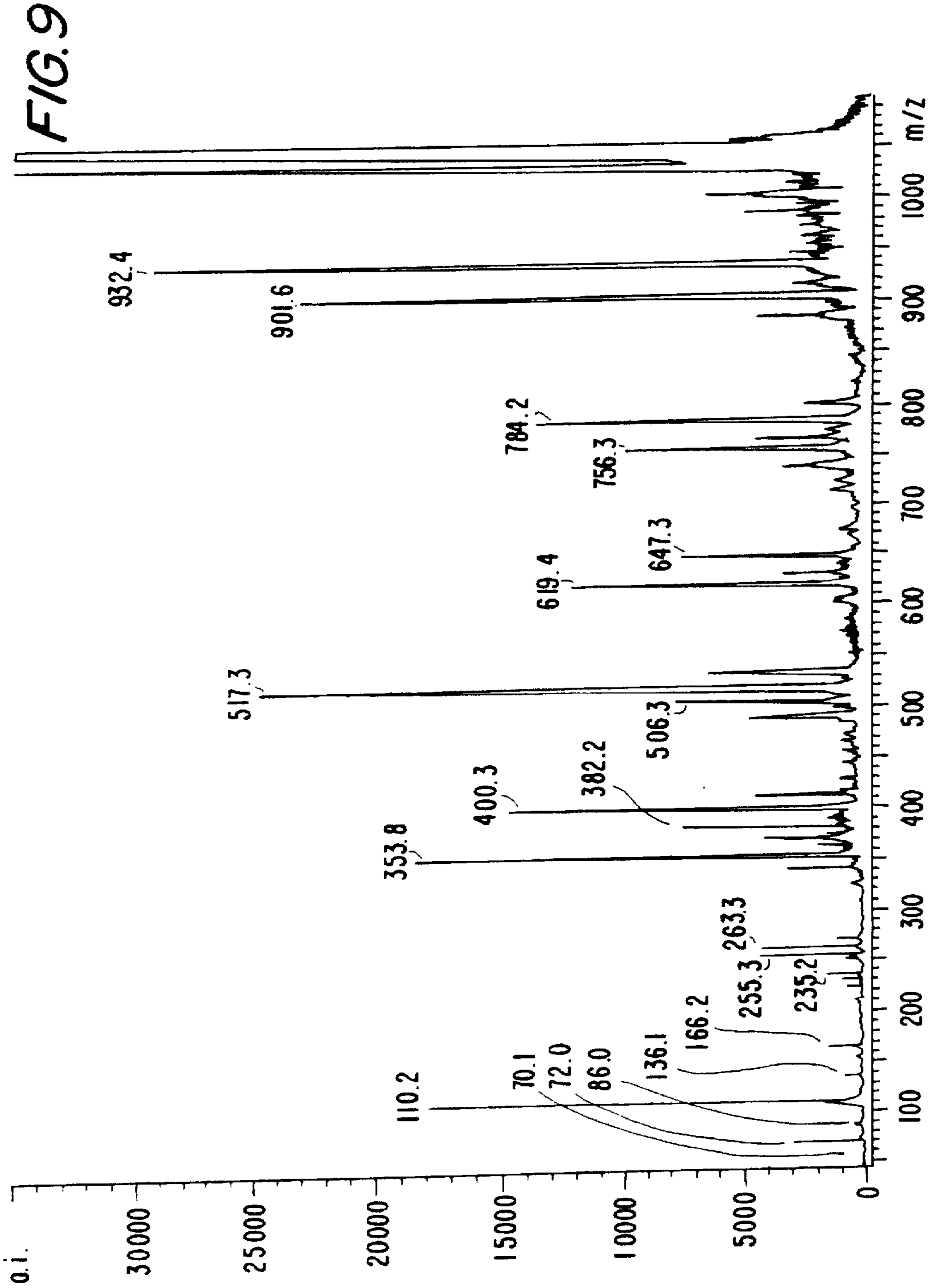
FIG. 9 is a graph of a daughter ion spectrum of angiotensin II, obtained using a postselector according to the present invention.

With respect to FIG. 9, a graph of a daughter ion spectrum of angiotensin II, obtained using a postselector in a similar manner as described above is shown. The mass of the daughter ions are determined via their flight time from source 2 to detector 7. When a single stage reflectron is used, the relationship between parent ion mass, daughter ion mass, and total daughter ion flight time is given by:

$$t=(L_1+L_3)\sqrt{\frac{M}{2qV_1}}+\frac{2mL_2}{qV_2}\sqrt{\frac{2qV_1}{M}} \quad (7)$$

where $L_1$ is the distance from the source to the reflectron, $L_2$ is the length of the reflectron, $L_3$ is the distance from the reflectron to the detector, $V_1$ is the source potential, $V_2$ is the reflectron potential, M is the parent ion mass, m is the daughter ion mass, and q is the elemental charge. A similar relationship holds when a two stage reflector such as that of the REFLEX spectrometer is used. Using such an equation, it is possible to calibrate a spectrum like that of FIG. 9 and thereby assign masses to the observed signals.

While the foregoing embodiments of the invention have been set forth in considerable detail for the purposes of making a complete disclosure of the invention, it will be apparent to those of skill in the art that numerous changes may be made in such details without departing from the spirit and the principles of the invention.

I claim:

1. An improved tandem time of flight mass spectrometer comprising:
- a deflector for deflecting a first ion from an ion path;
- a detector for detecting a second ion moving along said ion path;
- a collision cell for ion activation;
- at least two time of flight analysis regions; and
- at least one postselector comprising at least one conductive plate and being positioned between said time of flight analysis regions, for selecting reactant ions from said first and second ions and the products formed from said reactant ions after the ion activation.

2. An improved time of flight mass spectrometer according to claim 1 wherein said selector is formed by more than two conductive plates.

3. An improved time of flight mass spectrometer according to claim 2 wherein at least one of said conductive plates is metallic.

4. An improved time of flight mass spectrometer according to claim 1 wherein said selector is activated by pulsing from a first potential to a second potential.

5. An improved time of flight mass spectrometer according to claim 1 wherein said detector is responsive to the number of ions not deflected away from said ion path.

6. A postselector for analyzing ions in a tandem time of flight mass spectrometer having at least two analysis regions, said postselector comprising:
- a selector disposed along the flight tube of said tandem time of flight mass spectrometer;
- wherein said postselector is formed by a series of metal plates aligned to deflect reactant ions away from the direction of ion propagation along said flight tube to detect the products of said ion dissociation, and wherein said postselector is positioned between said analysis regions of said tandem time of flight mass spectrometer.

7. A postselector according to claim 6 wherein at least one of said plates is conductive.

8. A postselector according to claim 7 wherein at least one of said conductive plates is metallic.

9. A postselector according to claim 6 wherein said postselector deflects said ions into a plurality of directions.

10. A postselector according to claim 6 wherein said ion source includes a laser.

11. A postselector according to claim 6 wherein a data acquisition system is used to measure the time of flight of ions from said ion source to said detector.

12. A postselector according to claim 11 wherein a multiplicity of detectors are used.

13. A postselector according to claim 6 wherein a reflector is used to alter the path of ions away from said direction of propagation.

14. A postselector according to claim 6 wherein said postselector is used to select ions based on mass.

15. A mass selector for use in a tandem time of flight instrument comprising:
- a flight tube;
- a collision cell;
- at least two time of flight analysis regions;
- a postselector; and
- an ion source;
- wherein said ion source produces ions that travel through said flight tube;
- wherein selected ions undergo collisions with collision gas molecules within said collision cell thereby causing the origination of product ions;
- wherein said postselector is positioned between said time of flight analysis regions in said tandem time of flight instrument; and
- wherein said product ions arrive at said postselector simultaneously with the non-product ions.

16. A mass selector according to claim 15 wherein said selector is a gate formed of more than two metal plates, of which at least one of said plates is energized.

17. A mass selector according to claim 15 which includes a computer controller.

18. A mass selector according to claim 17 wherein said computer controller includes means to vary voltages applied to said gate.

19. An improved tandem time of flight mass spectrometer comprising:
- a deflector for deflecting a first ion from an ion path;
- a detector for detecting a second ion moving along said ion path;
- at least two time of flight analysis regions;
- a collision cell for ion activation; and
- a postselector for selecting the reactant ions from said first and second ions and the products formed from said reactant ions after said ion activation;
- wherein said postselector comprises at least one conductive plate; and
- wherein said ions are deflected away from said ion path by said postselector positioned between said time of flight analysis regions downstream from said collision cell.

20. An improved time of flight mass spectrometer according to claim 19 wherein said selector is formed by more than two conductive plates.

* * * * *